July 3, 1945.　　　C. W. PARISI　　　2,379,591
INDICATOR
Filed Oct. 24, 1942　　　2 Sheets-Sheet 1
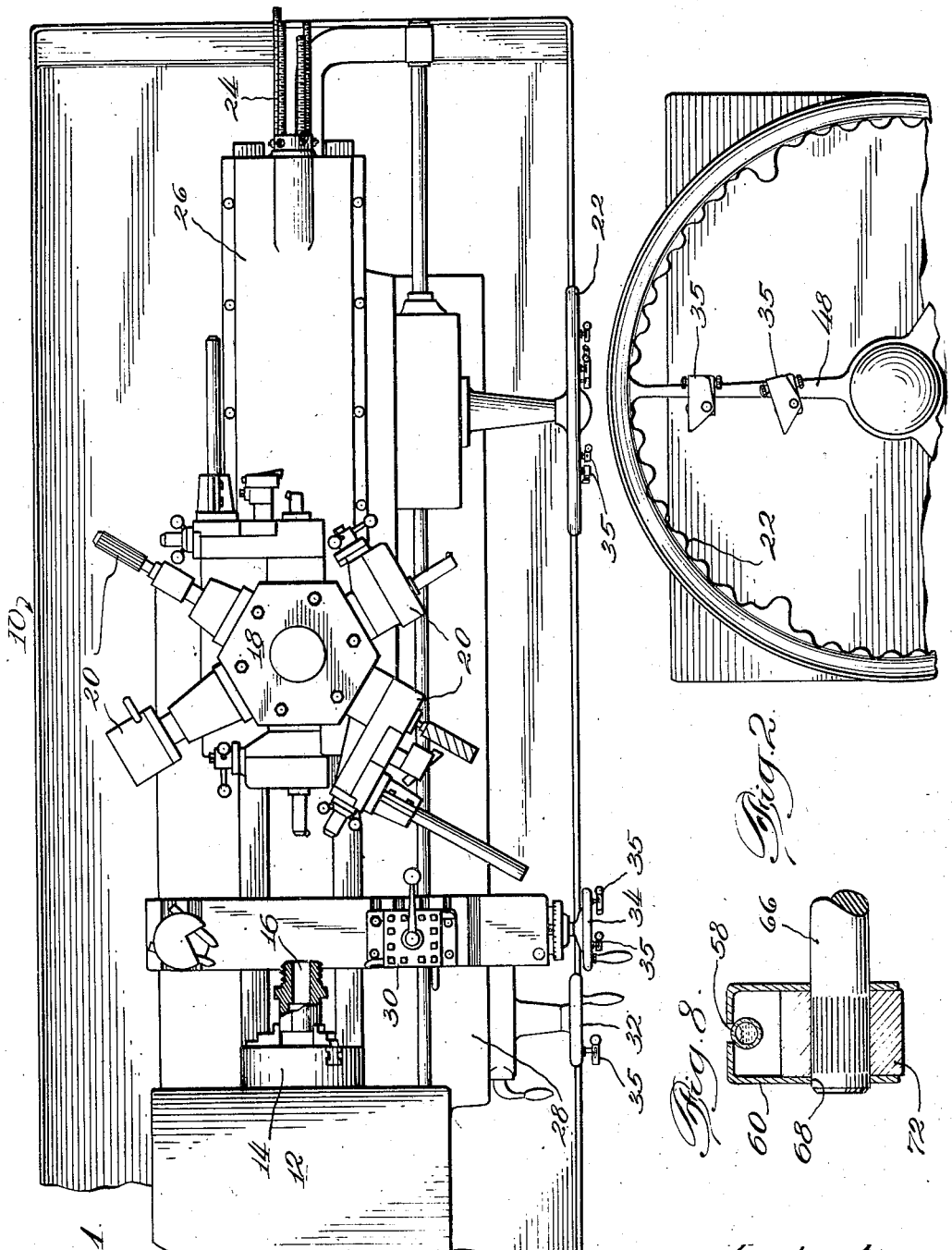
Inventor.
Charles W. Parisi
By
Williams, Bradbury & Hinkle
Attys.

July 3, 1945. C. W. PARISI 2,379,591
INDICATOR
Filed Oct. 24, 1942 2 Sheets-Sheet 2
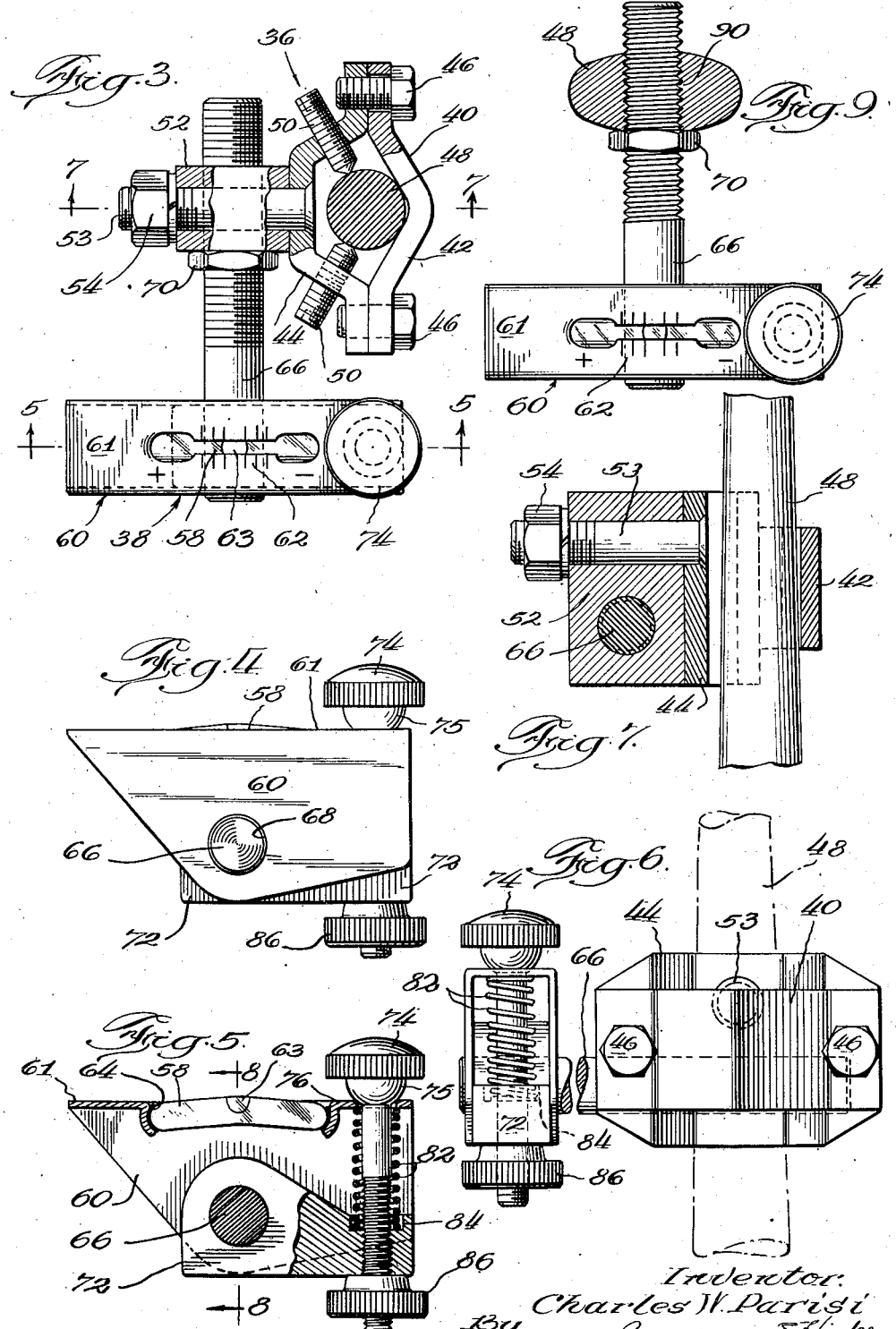

Patented July 3, 1945

2,379,591

UNITED STATES PATENT OFFICE 2,379,591

INDICATOR

Charles W. Parisi, Bellwood, Ill.

Application October 24, 1942, Serial No. 463,168

7 Claims. (Cl. 33—207)

My invention relates generally to indicators and more particularly to gravity type indicators for use with precision machine tools. While my invention is described herein as applied to a turret lathe, it is to be understood that my invention is adapted for use with many other machine tools such as milling machines, grinders, shapers, or almost any machine tool wherein a cutting or shaping element is brought to bear against the material which is being worked. Most machine tools now in general use are capable of attaining tolerances within one thousandth part of an inch, and many precision machines permit still closer tolerances. In attaining these close limits on semi-automatic machines such as the turret lathe, it is customary to feed the carriage into the work automatically until the cutting tool reaches a point only a fraction of an inch from where it is to stop, at which time an automatic feed knock-off terminates its travel. The carriage is then advanced manually the last fraction of an inch until its travel is terminated by a dead stop which has been set in a predetermined position with relation to the work. When the carriage reaches the dead stop, the cutting tool is theoretically at the precise point for which it was set. As a matter of fact, this point varies widely depending upon the force with which the individual operator brings the carriage against the stop. This is known as the "feel" of the machine. It generally takes years of experience for a machinist to acquire this "feel" so that he may work rapidly and to close tolerances without the constant use of precision measuring instruments. No two individuals use precisely the same force in the manual operation of a turret lathe. It is evident, therefore, that a machine which is set for one operator will have to be readjusted every time another person assumes its operation. This difficulty is amplified in the case of old or worn machines.

It is, therefore, a primary object of my invention to provide an indicator which will to a great extent dispense with the "human element" in the operation of machine tools, thereby enabling unskilled persons and novices to operate machines which were formerly operated only by skilled machinists.

Another object of my invention is the provision of an indicator which dispenses with the necessity of resetting the stops of a machine tool with each change of operators.

A further object of my invention is to provide an indicator which is adaptable for use with machine tools of various types and which can be readily transferred from one machine to another.

Another object is to provide an indicator which will enable old and worn machines to be worked to closer tolerances.

A further object is to provide an indicator which may be easily and quickly adjusted.

Another object of my invention is to provide an indicator which is simply and ruggedly constructed and which is economical to manufacture.

Other objects and advantages will appear in the accompanying decsription.

In the drawings:

Fig. 1 is a plan view of a turret lathe showing my invention applied thereto;

Fig. 2 is a detail view of a handwheel of a turret lathe showing the application of my indicator;

Fig. 3 is a plan view of my indicator showing it attached to the handwheel of a turret lathe;

Fig. 4 is a side elevational view thereof;

Fig. 5 is a sectional view taken on the line 5—5 of Fig. 3;

Fig. 6 is a rear elevational view of my indicator;

Fig. 7 is a sectional view taken on the line 7—7 of Fig. 3;

Fig. 8 is a sectional view of my indicator taken on the line 8—8 of Fig. 5; and

Fig. 9 is a plan view similar to Fig. 3 showing another method of attaching my indicator to a machine.

Referring to Fig. 1, a conventional turret lathe 10 has a head stock 12, which carries a chuck 14, in which is mounted the object to be worked upon 16. The lathe comprises in addition a hexagon turret 18 having mounted thereon a number of tools 20. Longitudinal movement of the hexagon turret 18 is controlled by means of a longitudinal feed handwheel 22. A plurality of adjustable stops 24 carried by the saddle 26 of the turret lathe determines the limit of longitudinal movement of the hexagon turret 18 into the work 16. The lathe further comprises a universal carriage 28 on which is mounted a square turret 30. Longitudinal movement of the universal carriage 28 is controlled by means of a universal carriage longitudinal handwheel 32, while the cross feed of the square turret is controlled by a cross feed handwheel 34.

My indicator 35 is adapted to be attached to the longitudinal feed handwheel 22 as well as to the cross feed handwheel 34 or the longitudinal feed handwheel 32.

Referring to Fig. 3, my indicator is composed essentially of two parts, the clamping means 36 for securing the indicator to a handwheel, and the indicating means and calibrated scale designated generally by the reference numeral 38. The indicator itself is adapted to be adjustably affixed preferably to the spokes of one or more handwheels or control wheels of a turret lathe. An oversize bracket 40 composed of two generally U-shaped members 42 and 44 detachably held together by screws 46 is securely clamped upon a spoke 48 by means of two safety screws 50 having pointed ends to provide a firmer connection.

Vertical adjustment of the indicator is provided by means of a bushing 52 which is pivotally mounted on a shaft 53 carried by the bracket 40 (see Figs. 3 and 7). The bushing 52 may be securely locked in position by means of a lock nut 54 on the shaft 53.

The indicating element of my invention comprises a sensitive liquid level 58 mounted in an adjustable cradle 60, the top 61 of which has a scale 62 which is read with the level 58. By the use of a magnifying glass, the edges of the bubble 63 in the level 58 may be made to appear perpendicular to the axis of the level, thus facilitating the reading of the indicator and providing greater accuracy. In Fig. 5 I have shown the level held in place by means of cement 64, although any other conventional means such as straps may be used.

The cradle 60 is pivotally mounted on a shaft 66 which extends through holes 68 in the sides of the cradle. The shaft 66 is threaded into the bushing 52 and provides the indicator with a rough horizontal adjustment which may be preserved by means of a retaining nut 70. The base 72 of the indicator is straddled by the cradle 60 and is press fitted on the shaft 66, thereby preventing axial movement of the cradle upon the shaft 66. (See Fig. 8.)

The final adjustment of my indicator is attained by means of an adjusting screw 74 which is threaded through the base 72 of the indicator and which has an extremely fine thread thereon. The head of the adjusting screw 74 has a spherically shaped underside 75 which provides an even bearing surface against the top 61 of the cradle 60 regardless of the angle assumed by the cradle. A spring 82 pressed between the underside of the top 61 and a recessed shoulder 84 in the base 72 serves to hold steady the parts of the indicator as well as to urge the cradle 60 upward when the adjusting screw 74 is being released. After the indicator has been finally adjusted by means of the screw 74, the adjustment is maintained by means of a lock nut 86.

Another embodiment which takes the place of the clamping means for my indicator is shown in Fig. 9. In this case there is substituted a drilled and tapped hole 90 in a spoke 48 of the handwheel. The shaft 66 of the indicator is threaded into this hole, and may be locked in position by means of the retaining nut 70, similarly to the embodiment shown in Fig. 3.

The operation and use of my indicator is as follows:

It is advisable to employ a separate indicator for each precision operation to be performed by the machine with which the indicator is used. For example, if each of the six tools on the hexagon turret 18 is to be employed for a precise machining operation, then it is necessary to attach six of my indicators to the longitudinal feed hand wheel 22 which controls the travel of the hexagon turret into the work 16. Of course, if all the operations to be performed are not of a precise nature, then it would be necessary to employ my indicators only in cases where close tolerances are to be preserved.

Likewise in the case of the square turret 30, if four precision operations are to be performed by the use of the cross feed, then at least four of my indicators must be attached to the cross feed handwheel 34. The same holds true in the case of the longitudinal feed handwheel 32.

In preparing my indicator for use in production work on a turret lathe, the initial procedure is the same as when a lathe is used without an indicator. That is, the work is chucked, the cutting tools are adjusted, and the automatic feed knock-offs and the dead stops are set. When these adjustments have been made, the lathe is ready for operation in the conventional manner.

My indicators are then clamped into position on the various handwheels, as described, there being one indicator for each precision operation to be performed by that handwheel. My indicator will be described as used with the longitudinal feed handwheel 22, although it is to be understood that the procedure is relatively the same in the case of the other handwheels. The indicator may be fastened at any place upon a spoke, and more than one indicator may be placed on each spoke. With each precision machining operation for which there is an indicator, that indicator is adjusted as follows:

The carriage is brought in the direction of the work by the automatic feed, until the feed knock-off terminates the travel of the carriage. The operator, in making the adjustment of my indicator, then moves the carriage manually into the work, making frequent precision measurements of the work by means of a micrometer or other measuring tool. The longitudinal feed handwheel 22 is stopped and held at the precise point where the proper micrometer reading is obtained. The indicator 35 on the handwheel is then adjusted so that the bubble 63 is in precise alignment with a designated line on the scale 62. As explained, the rough horizontal adjustment of the indicator is attained by revolving the shaft 66 in the bushing 52. The final adjustment is made by means of the adjusting screw 74, and is maintained by the lock nut 86. The dead stop may be set as for ordinary use, although it is the use of my indicator, rather than the dead stop, which now governs the final position of the cutting tool. Where before an operator was required to depend upon the feel of the carriage against the dead stop, with my indicator he has a positive representation that the cutting tool has reached the precise point for which it was set in relation to the work. Thus my indicator can be used either with or without the dead stop, although its operation will be facilitated by the use of the dead stop inasmuch as it provides a limit beyond which the operator cannot pass.

After adjusting an indicator for one precision operation as described, the turret is brought to its rearmost position whereupon it indexes and is ready for the next operation. If this is likewise a precision operation, another indicator is adjusted as described. This procedure is carried out with a different indicator for each precision operation. After all the indicators are initially adjusted, the machine is operated as usual, except that each precision operation is now indicated by my indicator, rather than by the feel of the machine.

From the foregoing description, it may be seen that my invention makes it possible for an unskilled person to carry out operations of the greatest accuracy with machine tools. After the proper adjustments have been made, and my indicators have been set, it is possible for a novice to attain precision work merely by bringing each hand wheel to its proper position in the proper sequence by means of my indicator. The adjustment remains the same for each operator, thereby making it unnecessary to alter the setting with each change of shifts.

In the case of old or worn machines, even though there may be a great deal of play in the lead screws, nevertheless my indicator will still show the precise point at which the handwheel is to be stopped, and thereby enables a far greater degree of uniformity to be obtained.

While I have shown and described a particular embodiment of my invention, it will be apparent to those skilled in the art that numerous modifications and variations may be made without departing from the underlying principles of the invention. I therefore desire, by the following claims, to include within the scope of the invention all such modifications and variations by which substantially the results thereof may be obtained by substantially the same or equivalent means.

Having illustrated and explained typical embodiments of my invention, what I claim and desire to secure by United States Letters Patent, is as follows:

1. An indicator for indicating the point for stopping a machine tool cut for use on a machine tool having a manually controlled, arcuately movable element for moving a cutting tool, comprising a level indicator, a bracket adapted to be secured to said arcuately movable element in an approximate upright position when said element is in the position it should assume at the end of a cut, said bracket including a stud and a base member secured to the outer end of said stud, level indicator carrying means pivotally mounting said level indicator to said stud for arcuate movement relative to said bracket, and means for nicely adjusting the relative positions of said bracket and said level indicator including spring means positioned between said base member and said level indicator carrying means to resist pivotal movement.

2. An indicator for indicating the point for stopping a machine tool cut for use on a machine tool having a manually controlled, arcuately movable element for moving a cutting tool, comprising a liquid level indicator, a bracket adapted to be secured to said arcuately movable element, said bracket including a stud and a base member secured to the outer end of said stud, level indicator cradling means pivotally mounting said level indicator to said stud for arcuate movement relative to said bracket about an axis substantially parallel to the axis of rotation of said arcuately movable element, and means for nicely adjusting the relative positions of said bracket and said level indicator including spring means positioned between said base member and said level indicator cradling means to resist arcuate movement of said level indicator cradling means relative to said base member.

3. An indicator for indicating the point for stopping a machine tool cut for use on a machine tool having a manually controlled, arcuately movable element for moving a cutting tool, comprising a liquid level indicator, a bracket adapted to be secured to said arcuately movable element, said bracket including a stud and a base member secured to the outer end of said stud, level cradling means pivotally mounting said level indicator to said stud, and means for nicely adjusting the relative positions of said bracket and said level indicator including resilient means positioned between said base member and said level cradling means to resist pivotal movement.

4. An indicator for indicating the point for stopping a machine tool cut for use on a machine tool having a handwheel for moving a cutting tool, comprising a level indicator, a bracket adapted to be secured to said handwheel, said bracket including a stud and a base member secured to the outer end of said stud, level indicator cradling means pivotally mounting said level indicator to said stud, and means for nicely adjusting the relative positions of said level indicator cradling means and said handwheel including spring means positioned between said base member and said level indicator mounting means to resist pivotal movement.

5. An indicator for indicating the point for stopping a machine tool cut for use on a machine tool having a manually controlled, arcuately movable element for moving a cutting tool, comprising a level indicator, a bracket adapted to be secured to said arcuately movable element in an approximate upright position when said element is in the position it should assume at the end of a cut, said bracket including a stud and a base member secured to the outer end of said stud, means pivotally mounting said level indicator to said stud for arcuate movement relative to said bracket about an axis substantially parallel to the axis of rotation of said arcuately movable element, and means for nicely adjusting the relative positions of said bracket and said level indicator including spring means positioned between said base member and said level indicator mounting means to resist pivotal movement and means to limit the action of said spring means.

6. An indicator for indicating the point for stopping a machine tool operation for use on a machine tool having a manually controlled, arcuately movable element for moving a cutting tool, comprising a level indicator of the bubble type, a bracket adapted to be secured to said arcuately movable element in an approximate upright position when said element is in the position it should assume at the end of a machine tool operation, said bracket having a stud extending substantially parallel to the axis of rotation of the arcuately movable element and a base member secured to the outer end of said stud, level indicator cradling means straddling said base member and pivotally mounted on said stud, and means for restraining relative movement between said base member and said level indicator cradling means.

7. An indicator for indicating the point for stopping a machine tool operation for use on a machine tool having a manually controlled, arcuately movable element for moving a cutting tool, comprising a level indicator of the bubble type, a bracket adapted to be secured to said arcuately movable element in an approximate upright position when said element is in the position it should assume at the end of a machine tool operation, said bracket having a stud extending substantially parallel to the axis of rotation of the arcuately movable element and a base member secured to the outer end of said stud, level indicator cradling means comprising a pair of side walls connected by a top wall having means therein to secure the bubble tube, said side walls being positioned on either side of said base member and pivotally mounted on said stud, resilient means positioned between said base member and said top wall, and means resisting the force of said resilient means whereby a nice adjustment may be made in the position of the level indicator relative to the arcuately movable element.

CHARLES W. PARISI.